US012082187B2

United States Patent
Papasakellariou

(10) Patent No.: US 12,082,187 B2
(45) Date of Patent: Sep. 3, 2024

(54) ACKNOWLEDGMENT INFORMATION FOR GROUPCAST COMMUNICATIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/456,155

(22) Filed: Nov. 22, 2021

(65) Prior Publication Data
US 2022/0183032 A1  Jun. 9, 2022

Related U.S. Application Data

(60) Provisional application No. 63/121,297, filed on Dec. 4, 2020.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01); *H04W 72/23* (2023.01)

(58) Field of Classification Search
CPC .............. H04W 72/1268; H04W 72/23; H04L 1/1812; H04L 5/0053; H04L 5/0055;
(Continued)

(56) References Cited

U.S. PATENT DOCUMENTS

2012/0082157 A1  4/2012  Yamada et al.
2013/0301503 A1*  11/2013  Park .................. H04L 1/1861
370/311
(Continued)

FOREIGN PATENT DOCUMENTS

WO    2019/226458 A1    11/2019

OTHER PUBLICATIONS

"5G; NR; Physical channels and modulation (3GPP TS 38.211 version 16.3.0 Release 16)", ETSI TS 138 211 V16.3.0, Nov. 2020, 136 pages.
(Continued)

*Primary Examiner* — Jamal Javaid
*Assistant Examiner* — Ryan C Kavleski

(57) ABSTRACT

Methods and apparatuses for reporting of acknowledgment information for groupcast/multicast communications. A method for transmitting a first physical uplink control channel (PUCCH) with first hybrid automatic repeat request acknowledgement (HARQ-ACK) information bits includes receiving information for a set of PUCCH resources. The method further includes determining values for the first HARQ-ACK information bits, determining a PUCCH resource from the set of PUCCH resources according to a combination of positive acknowledgement values and negative acknowledgement values for the first HARQ-ACK information bits, and transmitting the first PUCCH using the PUCCH resource.

18 Claims, 11 Drawing Sheets

(51) Int. Cl.
*H04L 5/00* (2006.01)
*H04W 72/23* (2023.01)

(58) Field of Classification Search
CPC ... H04L 1/1822; H04L 1/1861; H04L 1/1864; H04L 5/0094; H04L 1/1854
See application file for complete search history.

(56) References Cited

U.S. PATENT DOCUMENTS

| | | |
|---|---|---|
| 2014/0161060 A1 | 6/2014 | Nam et al. |
| 2020/0106564 A1 | 4/2020 | Rungta et al. |
| 2021/0250918 A1* | 8/2021 | Liu .................. H04W 72/23 |
| 2022/0052800 A1* | 2/2022 | Sun .................. H04L 1/1867 |
| 2022/0159691 A1* | 5/2022 | Chen ................. H04L 1/1812 |

OTHER PUBLICATIONS

"5G; NR; Multiplexing and channel coding (3GPP TS 38.212 version 16.3.0 Release 16)", ETSI TS 138 212 V16.3.0, Nov. 2020, 155 pages.
"5G; NR; Physical layer procedures for control (3GPP TS 38.213 version 16.3.0 Release 16)", ETSI TS 138 213 V16.3.0, Nov. 2020, 181 pages.
"5G; NR; Physical layer procedures for data (3GPP TS 38.214 version 16.3.0 Release 16)", ETSI TS 138 214 V16.3.0, Nov. 2020, 169 pages.
"5G; NR; Medium Access Control (MAC) protocol specification (3GPP TS 38.321 version 16.2.1 Release 16)", ETSI TS 138 321 V16.2.1, Nov. 2020, 156 pages.
"5G; NR; Radio Resource Control (RRC); Protocol specification (3GPP TS 38.331 version 16.2.0 Release 16)", ETSI TS 138 331 V16.2.0, Nov. 2020, 908 pages.
International Search Report dated Mar. 21, 2022 in connection with International Patent Application No. PCT/KR2021/018261, 3 pages.
Written Opinion of the International Searching Authority dated Mar. 21, 2022 in connection with International Patent Application No. PCT/KR2021/018261, 4 pages.
"5G; NR; Physical layer procedures for control (3GPP TS 38.213 version 15.5.0 Release 15)", ETSI TS 138 213 V15.5.0 (May 2019), 106 pages.

* cited by examiner

ACKNOWLEDGMENT INFORMATION FOR GROUPCAST COMMUNICATIONS

CROSS-REFERENCE TO RELATED APPLICATION AND CLAIM OF PRIORITY

This application claims priority under 35 U.S.C. § 119(e) to U.S. Provisional patent application No. Dec. 4, 2020, filed on 63/121,297. The above-identified provisional patent applications are hereby incorporated by reference in their entirety.

TECHNICAL FIELD

The present disclosure relates generally to wireless communication systems and, more specifically, the present disclosure relates to reporting of acknowledgment information for groupcast/multicast communications.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to acknowledgment information for groupcast communications.

In one embodiment, a method for transmitting a first physical uplink (UL) control channel (PUCCH) with first hybrid automatic repeat request acknowledgement (HARQ-ACK) information bits is provided. The method includes receiving information for a set of PUCCH resources, determining values for the first HARQ-ACK information bits, determining a PUCCH resource from the set of PUCCH resources according to a combination of positive acknowledgement values and negative acknowledgement values for the first HARQ-ACK information bits, and transmitting the first PUCCH using the PUCCH resource.

In another embodiment, a user equipment (UE) is provided. The UE includes a transceiver configured to receive information for a set of PUCCH resources. The UE also includes a processor operably coupled to the transceiver. The processor configured to determine values for first HARQ-ACK information bits and a PUCCH resource from the set of PUCCH resources according to a combination of positive acknowledgement values and negative acknowledgement values for the first HARQ-ACK information bits. The transceiver is further configured to transmit a first PUCCH using the PUCCH resource.

In yet another embodiment, a base station is provided. The base station includes a transceiver configured to transmit information for a set of PUCCH resources and receive a first PUCCH based on a PUCCH resource from the set of PUCCH resources. The base station also includes a processor operably coupled to the transceiver, the processor configured to determine a combination of positive acknowledgement values and negative acknowledgement values for first HARQ-ACK information bits according to the PUCCH resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
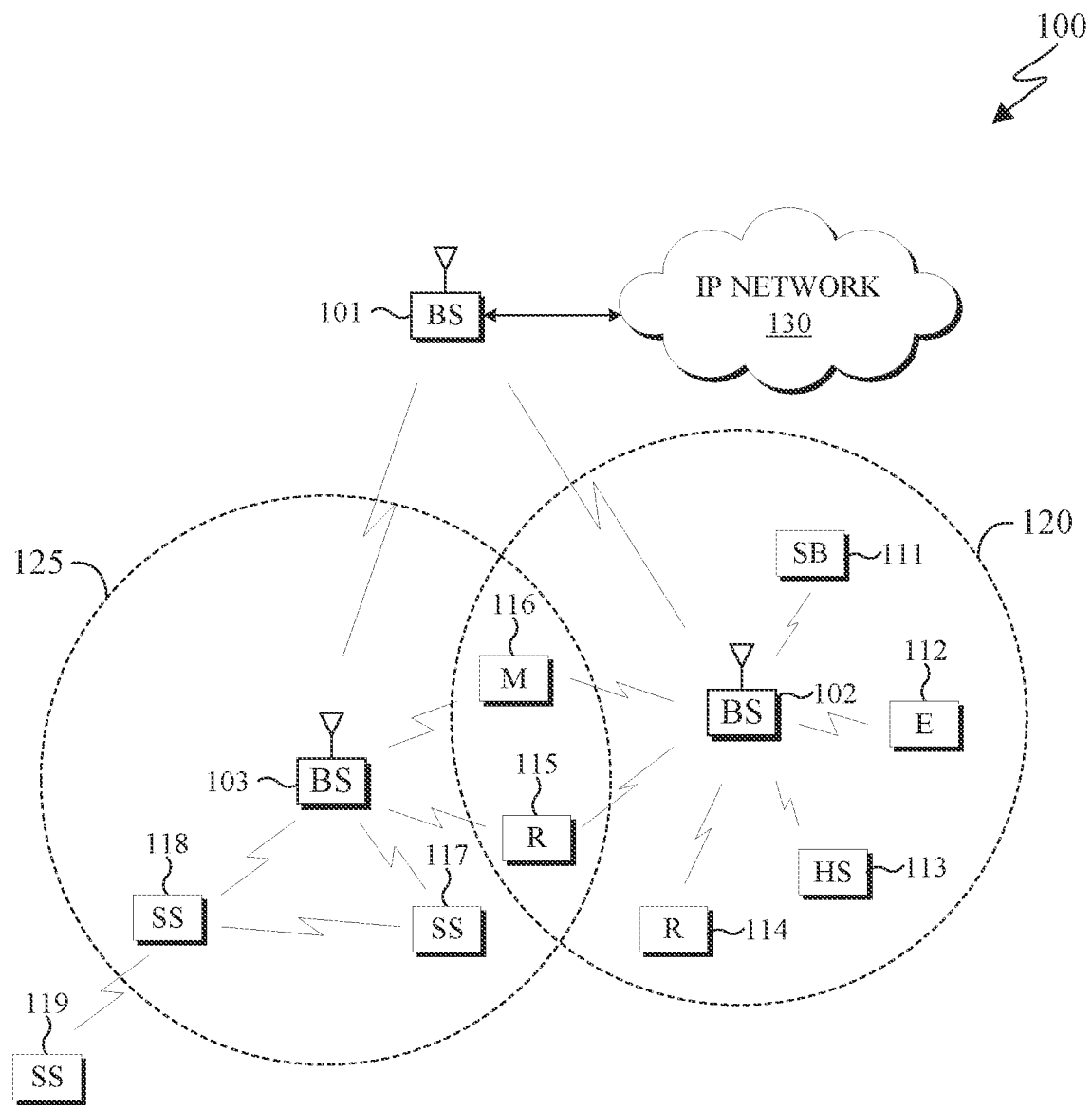
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v 16.3.0, "NR; Physical channels and modulation," 3GPP TS 38.212 v 16.3.0, "NR; Multiplexing and Channel coding," 3GPP TS 38.213 v 16.3.0, "NR; Physical Layer Procedures for Control," 3GPP TS 38.214 v 16.3.0, "NR; Physical Layer Procedures for Data," 3GPP TS 38.321 v 16.2.1, "NR; Medium Access Control (MAC) protocol specification," and 3GPP TS 38.331 v 16.2.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

As described in greater detail below, embodiments of the present disclosure describe acknowledgement information by a UE to a base station in response to reception of groupcast PDSCH.

Figure 2:
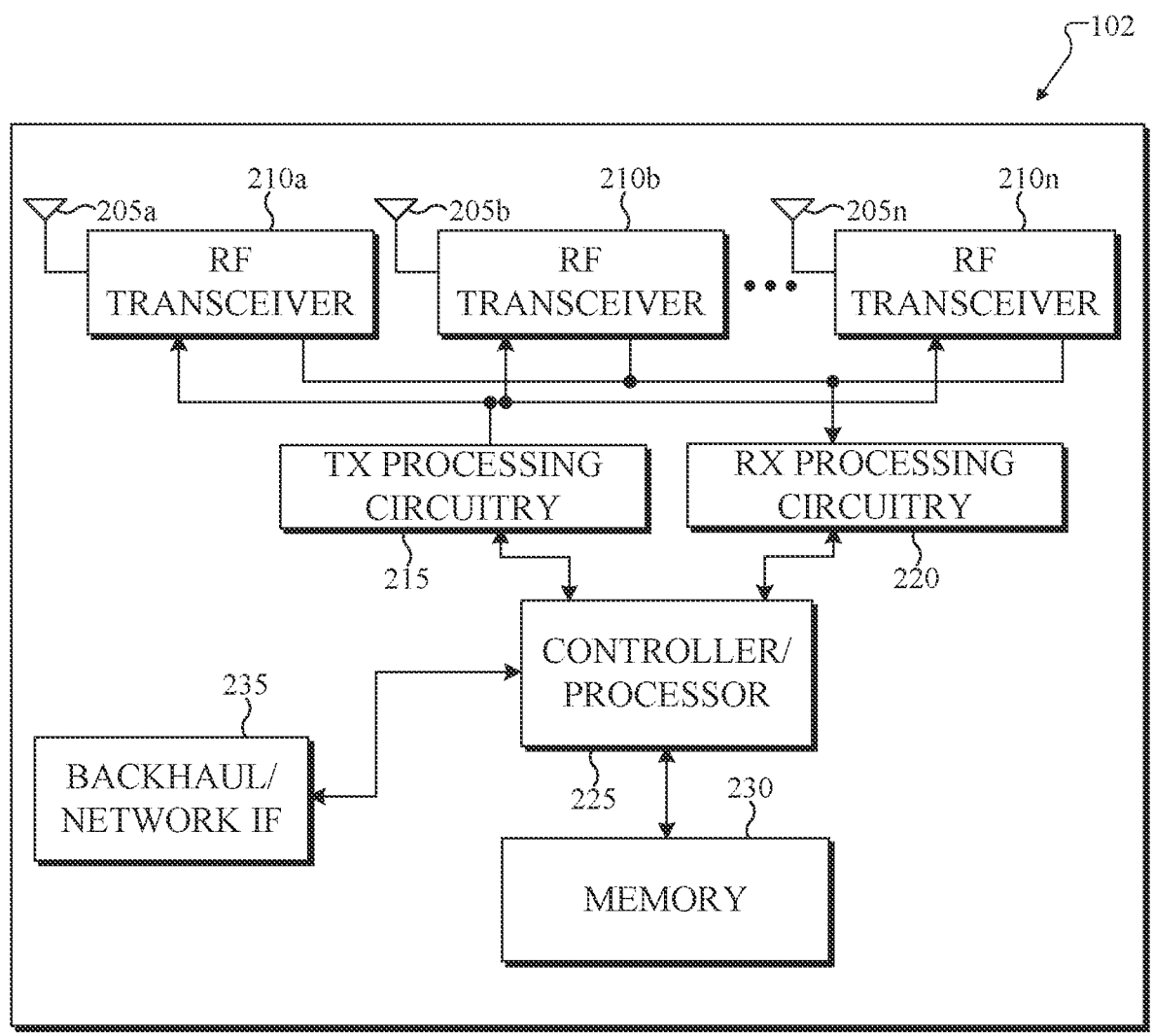
FIG. 2 illustrates an example base station (BS) according to embodiments of the present disclosure.
Figure 3:
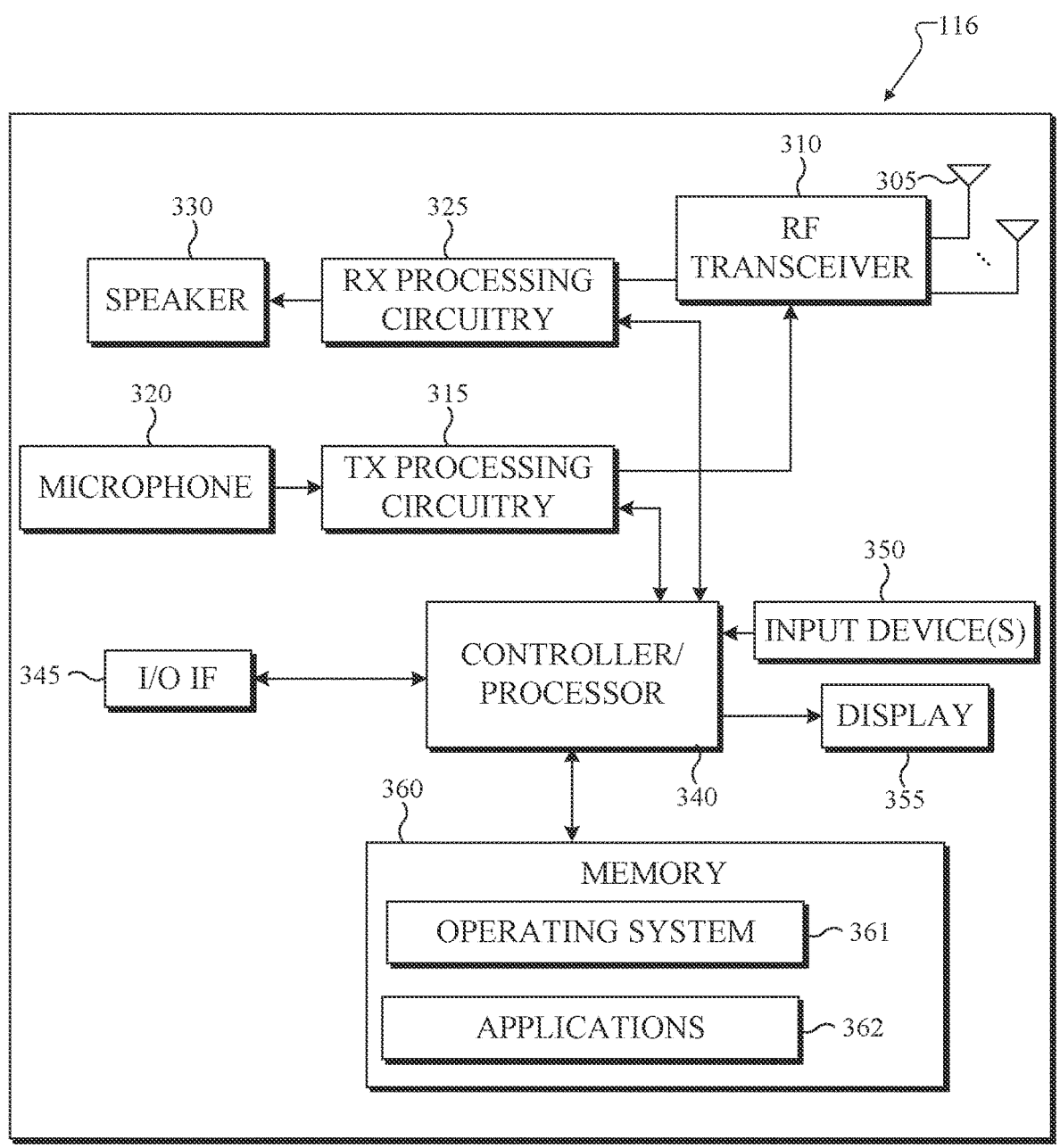
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programing, or a combination thereof for acknowledgment information for groupcast communications. In certain embodiments, and one or more of the BSs 101-103 includes circuitry, programing, or a combination thereof for acknowledgment information for groupcast communications.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support acknowledgment information for groupcast communications. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports acknowledgment information for groupcast communications. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
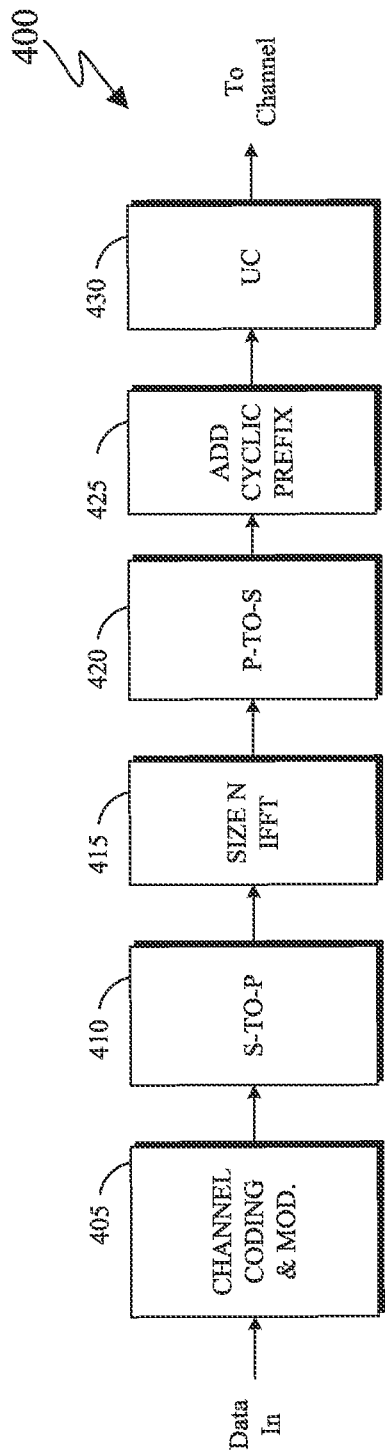
FIGS. 4 and 5 illustrate example wireless transmit and receive paths according to embodiments of present disclosure.
Figure 5:
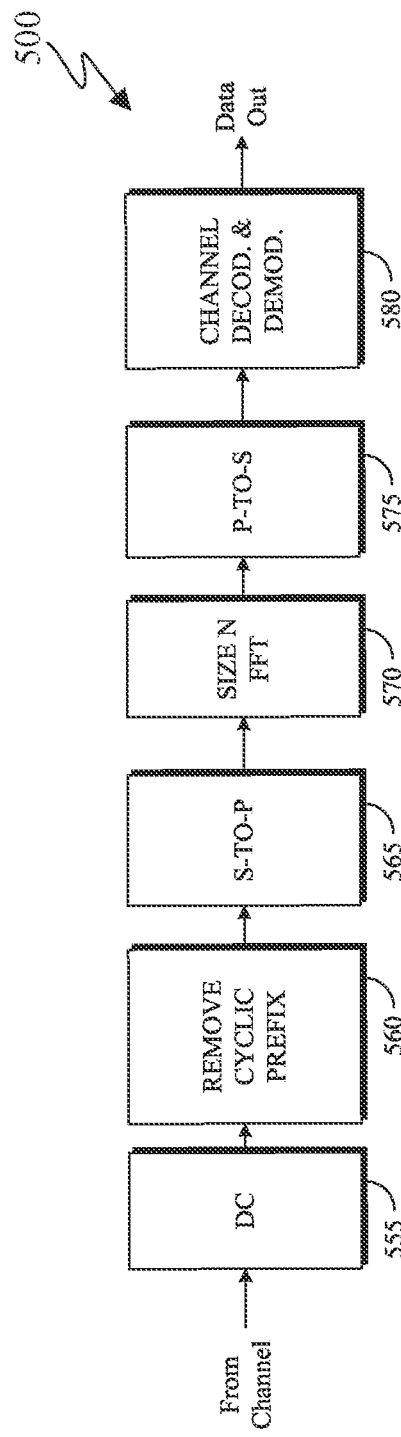

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support acknowledgment information for groupcast communications as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the DL to UEs 111-118 and may implement a receive path 500 as illustrated in FIG. 5 that is analogous to receiving in the UL from UEs 111-118. Similarly, each of UEs 111-118 may implement the transmit path 400 for transmitting in the UL to the BSs 101-103 and may implement the receive path 500 for receiving in the DL from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol.

A PDCCH transmission that is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

The term "higher layers" is used to denote control information that a UE is provided in a PDSCH reception, such as radio resource control (RRC) or a medium access control (MAC) control element (CE).

A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as RRC signaling from a BS. A DM-RS is typically transmitted within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a BS to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request (HARD) acknowledgement (ACK) information, indicating correct or incorrect decoding of transport blocks (TBs) or of code block groups (CBGs) in a PDSCH, scheduling request (SR) indicating whether a UE has data in its buffer to transmit, and CSI reports enabling a BS to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ feedback timing indicator field in the DCI format, from a set of slot timing values $K_1$, or indicated by higher layers in case of a SPS PDSCH reception.

In certain embodiments, UL RS includes demodulation reference signal (DMRS) and SRS. DMRS is typically transmitted within a BW of a respective PUSCH or PUCCH. A BS can use a DMRS to demodulate information in a respective PUSCH or PUCCH. SRS is transmitted by a UE to provide a BS with an UL CSI and, for a time division duplex (TDD) system, to also provide a PMI for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. DL transmissions from a BS and UL transmissions from a UE can be based on an orthogonal frequency division multiplexing (OFDM) waveform including a variant using DFT precoding that is known as DFT-spread-OFDM.

Figure 6:
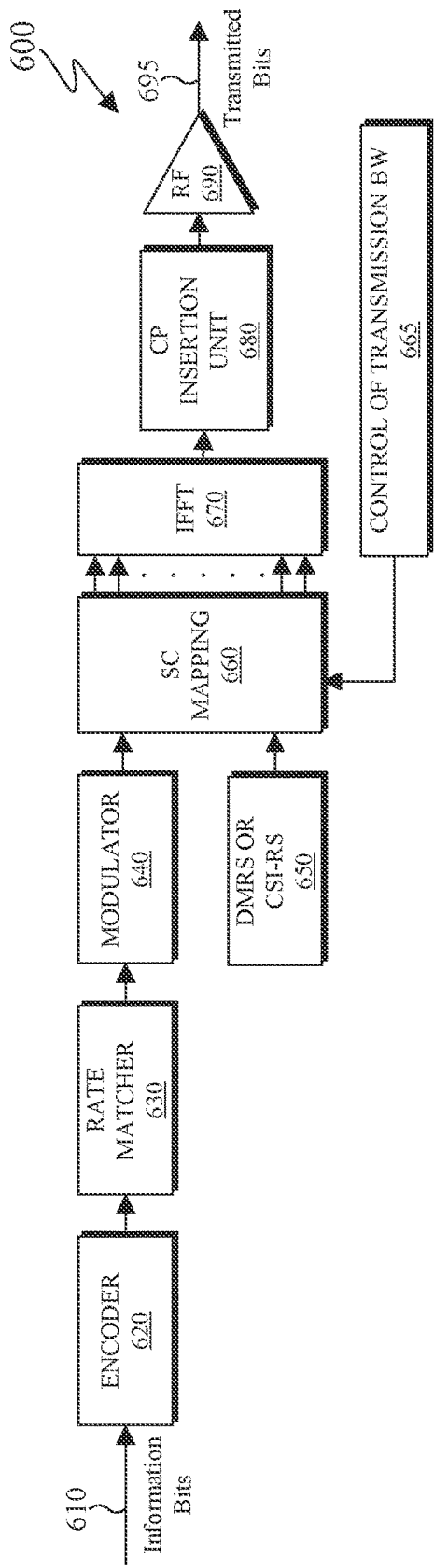
FIG. 6 illustrates a block diagram of an example transmitter structure using orthogonal frequency division multiplexing (OFDM) according to embodiments of the present disclosure.
Figure 7:
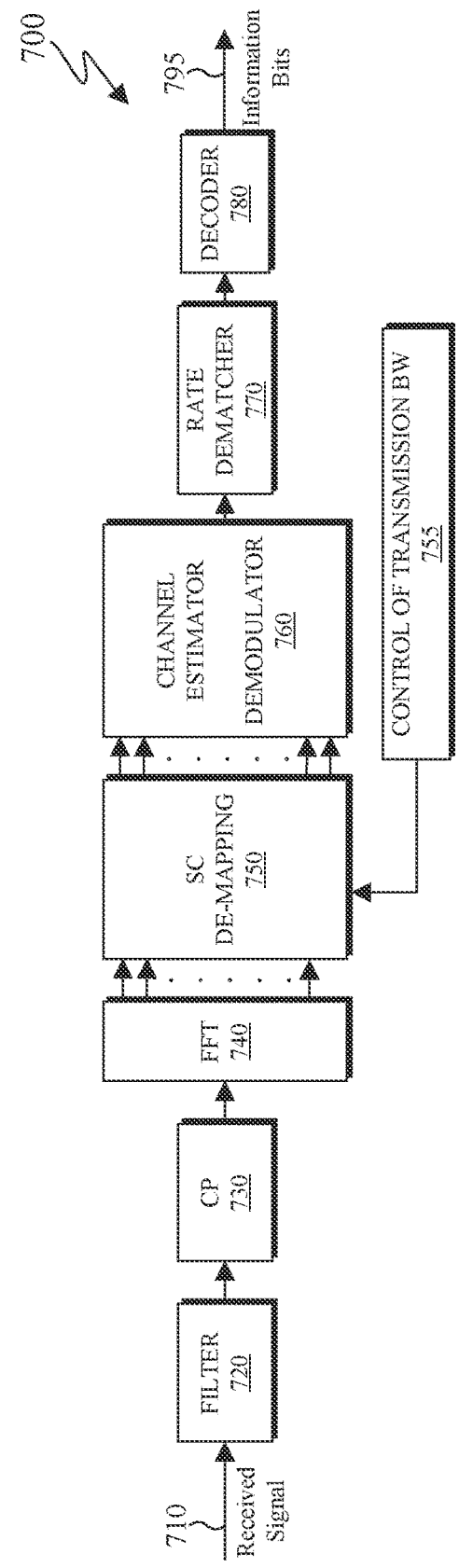
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) monitors multiple candidate locations for respective potential PDCCH receptions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) an MCS-C-RNTI and serves as a UE identifier. In the following, for brevity, only the C-RNTI will be referred to when needed. A UE typically receives/monitors PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type3-PDCCH CSS.

Similar to DCI formats providing information to a UE for parameters associated with receptions or transmissions by the UE, a UE can be configured to monitor PDCCH for detection of a DCI format scheduling a broadcast or a groupcast PDSCH transmission. Such a DCI format may not include a PUCCH resource indication for each UE from the group of UEs, or may not include a counter DL assignment index (DAI) or a total DAI for determination of a Type-2 HARQ-ACK codebook, and the like. Additionally, there may not be another DCI format for the UE to detect before the UE needs to provide an acknowledgement information report regarding a detection of the DCI format.

When a UE does not detect a DCI format providing information for parameters associated with receptions or transmissions by the UE, it is generally beneficial for the UE to inform a serving BS so that the UE and the BS have a same understanding. Such information can be considered as acknowledgement information for the detection or absence of detection of the DCI format.

In certain embodiments, a UE reports HARQ-ACK information in response to correct or incorrect detection of a DCI format together with HARQ-ACK information in response to correct of incorrect detection of TBs. For example, the HARQ-ACK information for a detection of a DCI format can be for a DCI format indicating an SPS PDSCH release or for a DCI format indicating a dormant/non-dormant BWP for a cell from a group of cells, and the like. For brevity, only HARQ-ACK information in response to correct or incorrect reception of TBs is subsequently considered but it should be understood that HARQ-ACK information can also be in response to additional reception outcomes.

The HARQ-ACK information report can be based on one of several codebook types such as a Type-1 HARQ-ACK codebook or a Type-2 HARQ-ACK codebook. A PUCCH resource determination and a determination of an HARQ-ACK codebook can be different for the two HARQ-ACK information types. This is because a DCI format providing information for a group of UEs or scheduling a PDSCH reception by a group of UEs may not include a field indicating a PUCCH resource for each UE from the group of UEs, or may not include a DAI, and so on. Also, when a UE does not detect a DCI format, there may not be another DCI format for the UE to detect before the UE needs to provide HARQ-ACK information regarding a detection of the DCI format.

In certain embodiments, a UE determines a PUCCH transmission power $P_{PUCCH,b,f,c}$ on an active UL BWP b of carrier f in a cell c using PUCCH power control adjustment state with index l as in Equation (1), below.

$$P_{PUCCH,b,f,c} = \min\left\{\begin{array}{l} P_{CMAX,f,c} \\ P_{O\_PUCCH,b,f,c} + 10\log_{10}(2^{\mu} \cdot M_{RB,b,f,c}^{PUCCH}) + \\ PL_{b,f,c} + \Delta_{F\_PUCCH} + \Delta_{TF,b,f,c} + g_{b,f,c} \end{array}\right\} \quad (1)$$

Here, the parameter $P_{CMAX,f,c}$ is a maximum transmission power. The parameter $P_{O\_PUCCH,b,f,c}$ is a nominal received power. The parameter $\mu$ is a sub-carrier spacing (SCS) configuration with $\mu$=0 corresponding to 15 kHz. The parameter $M_{RB,b,f,c}^{PUCCH}$ is a number of RBs for the PUCCH transmission. The parameter $PL_{b,f,c}$ is a measured path-loss. It is noted that the parameter $\Delta_{F\_PUCCH}$, of Equation (1), depends on several parameters for the PUCCH transmission including a PUCCH format. The parameter $\Delta_{TF,b,f,c}$ provides an adjustment according to a spectral efficiency. The parameter $g_{b,f,c}$ is a closed-loop power control state based on transmit power control (TPC) command values the UE receives in DCI formats.

In certain embodiments, a UE multiplexes HARQ-ACK information in a PUSCH transmission. Then, a UE determines a number of coded modulation symbols for the HARQ-ACK information based on a number of HARQ-ACK information bits, a spectral efficiency of the PUSCH transmission, and a scaling factor $\beta_{offset}^{HARQ-ACK}$. The UE can also reserve a number of REs offset in the PUSCH transmission for multiplexing a number of HARQ-ACK information bits, such as two bits, in order to avoid error events where a serving BS expects HARQ-ACK information to be multiplexed in the PUSCH transmission, but the UE fails to detect a DCI format associated with the HARQ-ACK information.

If a PDSCH reception is by a single UE, it can be referred to as unicast PDSCH reception. Alternatively, if a PDSCH receptionist by a group of UEs and is then referred to as groupcast PDSCH reception. In certain embodiments, a UE is configured to receive both unicast PDSCH and groupcast PDSCH. The UE can identify whether a PDSCH reception is a unicast one or a groupcast on based on the DCI format scheduling the PDSCH reception or based on a configuration by higher layers when the PDSCH reception is not scheduled by a DCI format. For example, a DCI format with CRC scrambled by a first RNTI, such as a cell-RNTI (C-RNTI), or having a field indicating a first PDSCH type, such as unicast PDSCH, can be used to schedule a unicast PDSCH reception while a DCI format with CRC scrambled by a second RNTI, such as a group-RNTI (G-RNTI), or having a field indicating a second PDSCH type, such as groupcast PDSCH (or multicast PDSCH or broadcast PDSCH), can be used to schedule a groupcast PDSCH reception.

When a UE receives both unicast PDSCH and groupcast PDSCH, the UE should determine how to provide corresponding HARQ-ACK information. A first option is for the UE to determine separate HARQ-ACK codebooks for unicast PDSCH receptions and for groupcast PDSCH receptions. The UE can then multiplex each of the HARQ-ACK codebooks in a separate corresponding PUCCH transmission or the UE can jointly or separately encode and multiplex the HARQ-ACK codebooks in a same PUCCH transmissions.

A second option is for the UE to determine a single HARQ-ACK codebook for unicast PDSCH receptions and for groupcast PDSCH receptions. The second option is not generally possible for a Type-2 HARQ-ACK codebook as, unlike a value of a first DAI field in a DCI format scheduling a unicast PDSCH reception, a value of a second DAI field in a DCI format scheduling a groupcast PDSCH reception cannot be specific to a UE and therefore the UE cannot determine a Type-2 HARQ-ACK codebook by jointly processing the values of the first and second DAI fields. For a Type-1 HARQ-ACK codebook, determining a single HARQ-ACK codebook for unicast PDSCH receptions and for groupcast PDSCH receptions is possible. A Type-1 HARQ-ACK codebook is more robust to missed detections of DCI format than a Type-2 HARQ-ACK codebook, but it also results to a larger codebook size. If a Type-1 HARQ-ACK codebook for unicast PDSCH receptions and a Type-1 HARQ-ACK codebook for groupcast PDSCH receptions are to be multiplexed in a same PUCCH or PUSCH, the corresponding overhead can be large and that can also reduce coverage for a given target reception reliability. It is therefore beneficial to jointly determine a Type-1 HARQ-ACK codebook for unicast and groupcast PDSCH receptions.

A UE can support a predetermined number of HARQ processes. For example, a UE (such as the UE 116) can support 16 HARQ processes. The number of supported HARQ processes can be a requirement or a capability that the UE reports to a serving BS. When a UE is configured to receive both unicast PDSCH and groupcast PDSCH, a HARQ process for a corresponding TB can be associated either with a unicast PDSCH or with a groupcast PDSCH for a corresponding Type-2 HARQ-ACK codebook. When an initial reception of a TB is provided by a groupcast PDSCH reception by a UE and an additional reception of the TB is provided by a unicast PDSCH reception by the UE (such as when the UE reports a NACK value for the initial reception of the TB) there is a need for the UE to determine whether to multiplex HARQ-ACK information for the additional reception of the TB in a HARQ-ACK codebook for groupcast PDSCH receptions or in a HARQ-ACK codebook for unicast PDSCH receptions.

In certain embodiments, when a UE provides HARQ-ACK information for a PDSCH reception, the UE is configured to transmit a PUCCH only when a value for the HARQ-ACK information is NACK. For example, for groupcast PDSCH receptions, a motivation can be to reduce PUCCH overhead as a single PUCCH resource may be configured for use by all UEs. For example, another motivation can be to conserve UE power when it is most likely that the value for the HARQ-ACK information is ACK. One operational problem with a UE transmitting PUCCH only to indicate a NACK value is that the UE may fail to detect a DCI format scheduling a PDSCH reception; then the UE would not transmit a PUCCH while a serving BS would determine an absence of a PUCCH reception to imply a correct decoding of a TB provided by the PDSCH reception. Therefore, embodiments of the present disclosure take into consideration that there is a need to determine conditions for a UE to transmit a PUCCH only to indicate a NACK value for a HARQ-ACK information.

In some scenarios, a BS can disable HARQ-ACK reporting from a group UEs in response to groupcast PDSCH receptions. Enabling or disabling a HARQ-ACK information report can be by a corresponding 1-bit field in a DCI format scheduling a groupcast PDSCH reception or by higher layer signaling. For example, the BS may want to utilize for other purposes in a slot the PUCCH resources that would be used by the group of UEs to report HARQ-ACK information in the slot and can then indicate disabling of HARQ-ACK information report in the DCI format scheduling the groupcast PDSCH reception. For another example, the BS may determine that a latency for the HARQ-ACK information report for a groupcast PDSCH reception may be smaller than a time until next available PUCCH resources for the group of UEs to transmit PUCCH with the HARQ-ACK information and that the BS can then indicate disabling of HARQ-ACK information report in the DCI format scheduling the groupcast PDSCH reception. However, enabling or disabling of HARQ-ACK information by a DCI format scheduling a groupcast PDSCH reception is applicable to all UEs and that can be inefficient for PUCCH resource utilization or for UE power consumption because it is typically sufficient only for UEs experiencing low signal-to-interference and noise ratios (SINRs) to provide an HARQ-ACK information report. The reason is that if UEs with low SINRs correctly decode a TB in a groupcast PDSCH reception, it is highly likely that UEs with medium/large SINRs will also correctly decode the TB. Otherwise, the groupcast PDSCH providing the TB can be retransmitted for all UEs or only for the UE indicating a NACK value as HARQ-ACK information for the TB. Therefore, embodiments of the present disclosure take into consideration that there is a need to enable/disable an HARQ-ACK information report, by a DCI format scheduling a groupcast PDSCH reception to a group of UEs, for a sub-group of the group of UEs.

In certain embodiments, a serving BS provides by higher layer signaling to a UE a PUCCH resource set for the UE to determine a PUCCH resource for transmission of HARQ-ACK information in response to a correct or incorrect detection of a TB in a groupcast PDSCH reception. As a DCI format scheduling a groupcast PDSCH reception cannot indicate a PUCCH resource individually to each UE, a PUCCH resource indicator field may be omitted from the DCI format and the UE can determine a PUCCH resource from the PUCCH resource set based on a HARQ-ACK information payload. To enable flexible allocation of PUCCH resources, a PUCCH resource indicator field, with fixed or configurable size, can be included in a DCI format scheduling a groupcast PDSCH reception and a UE can then determine a PUCCH resource based on a value of the field.

HARQ-ACK information in response to TB receptions from unicast PDSCH receptions can be associated with multiple priorities. Similar, HARQ-ACK information in response to TB receptions from groupcast PDSCH receptions can also be associated with multiple priorities. When a UE (such as the UE 116) transmits a first PUCCH with HARQ-ACK information report associated with a detection of a DCI format with CRC scrambled by a C-RNTI (unicast HARQ-ACK information) and a second PUCCH with HARQ-ACK information report associated with a detection of a DCI format with CRC scrambled by a G-RNTI (groupcast HARQ-ACK information), the UE also determines whether to multiplex the two HARQ-ACK information reports in a same PUCCH. If the UE determines to multiplex the two HARQ-ACK information reports in a same PUCCH, the UE also determines a corresponding PUCCH resource. Otherwise, the UE determines whether to transmit the first PUCCH or the second PUCCH (and to drop transmission of the second PUCCH or the first PUCCH, respectively). Therefore, embodiments of the present disclosure take into consideration that there is a need for a UE to determine conditions for multiplexing unicast and groupcast HARQ-ACK information reports in a same PUCCH (or PUSCH), to determine a corresponding PUCCH resource, or to determine whether to multiplex only unicast HARQ-ACK information report or only a groupcast HARQ-ACK information report in a PUCCH (or PUSCH).

Embodiments of the present disclosure take into consideration that there is a need to jointly determine a Type-1 HARQ-ACK codebook for unicast and groupcast PDSCH receptions and separately determine Type-2 HARQ-ACK codebooks for respective unicast and groupcast PDSCH receptions. Embodiments of the present disclosure also take into consideration that there is a need to determine a HARQ-ACK codebook for multiplexing HARQ-ACK information for a TB decoding outcome in a unicast PDSCH reception (scheduled by a DCI format with CRC scrambled with C-RNTI) when the TB was previously incorrectly decoded in a groupcast PDSCH reception (scheduled by a DCI format with CRC scrambled with G-RNTI). Embodiments of the present disclosure further take into consideration that there is a need to determine conditions for a UE to transmit a PUCCH only to indicate a NACK value for a HARQ-ACK information. Additionally, embodiments of the present disclosure take into consideration that there is a need to enable/disable an HARQ-ACK information report, by a DCI format scheduling a groupcast PDSCH reception to a group of UEs, for a sub-group of the group of UEs. Embodiments of the present disclosure additionally take into consideration that there is a need for a UE to determine conditions for multiplexing unicast and groupcast HARQ-ACK information reports in a PUCCH (or PUSCH), to determine a corresponding PUCCH resource, or to determine whether to multiplex only unicast HARQ-ACK information report or only a groupcast HARQ-ACK information report in a PUCCH (or PUSCH).

Accordingly, embodiments of the present disclosure relate to jointly determining a Type-1 HARQ-ACK codebook for unicast and groupcast PDSCH receptions and separately determining Type-2 HARQ-ACK codebooks for respective unicast and groupcast PDSCH receptions. Embodiments of the present disclosure also relate to determining a HARQ-ACK codebook for multiplexing HARQ-ACK information for a TB decoding outcome in a unicast PDSCH reception (scheduled by a DCI format with CRC scrambled with C-RNTI) when the TB was previously incorrectly decoded in a groupcast PDSCH reception (scheduled by a DCI format with CRC scrambled with G-RNTI). Embodiments of the present disclosure further relate to determining conditions for a UE to transmit a PUCCH only to indicate a NACK value for a HARQ-ACK information. Additionally, embodiments of the present disclosure relate to enabling/ disabling an HARQ-ACK information report, by a DCI format scheduling a groupcast PDSCH reception to a group of UEs, for a sub-group of the group of UEs. Embodiments of the present disclosure additionally relate to determining conditions for multiplexing unicast and groupcast HARQ-ACK information reports in a PUCCH (or PUSCH), to determine a corresponding PUCCH resource, or to determine whether to multiplex only unicast HARQ-ACK information report or only a groupcast HARQ-ACK information report in a PUCCH (or PUSCH).

In the following examples and embodiments, a reference to HARQ-ACK information associated with DCI formats scheduling PDSCH receptions is typically with respect to PDSCH receptions but can also be for reception of a SPS PDSCH release or for a DCI format with CRC scrambled by a RNTI associated with scheduling a PDSCH reception that instead indicates dormant/non-dormant active DL BWPs for the UE in a group of cells without scheduling a PDSCH reception.

Embodiments of the present disclosure describe Type-1 HARQ-ACK codebook unicast and groupcast PDSCH receptions. The following examples and embodiments, such as those of FIGS. 8 and 9 describe Type-1 HARQ-ACK codebook unicast and groupcast PDSCH receptions. For example, the present disclosure describes a procedure for a UE to construct a single Type-1 HARQ-ACK codebook for unicast and groupcast PDSCH receptions. For instance, as determined by a RNTI scrambling a CRC of a DCI format scheduling each reception or as configured by higher layers for SPS PDSCH receptions.

Figure 8:
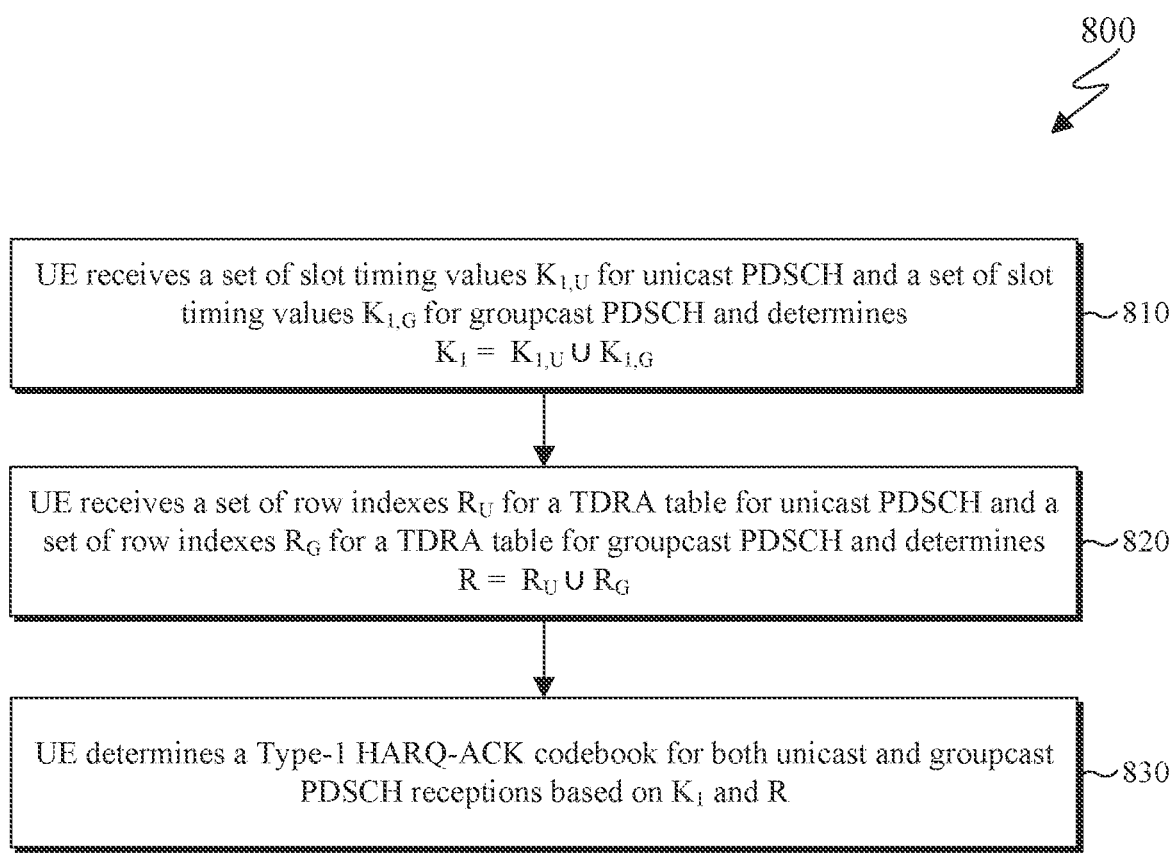
FIG. 8 illustrates an example method for a UE jointly determining for unicast physical downlink (DL) shared channel (PDSCH) receptions and groupcast PDSCH receptions a single type-1 hybrid HARQ-ACK codebook according to embodiments of the present disclosure.
Figure 9:
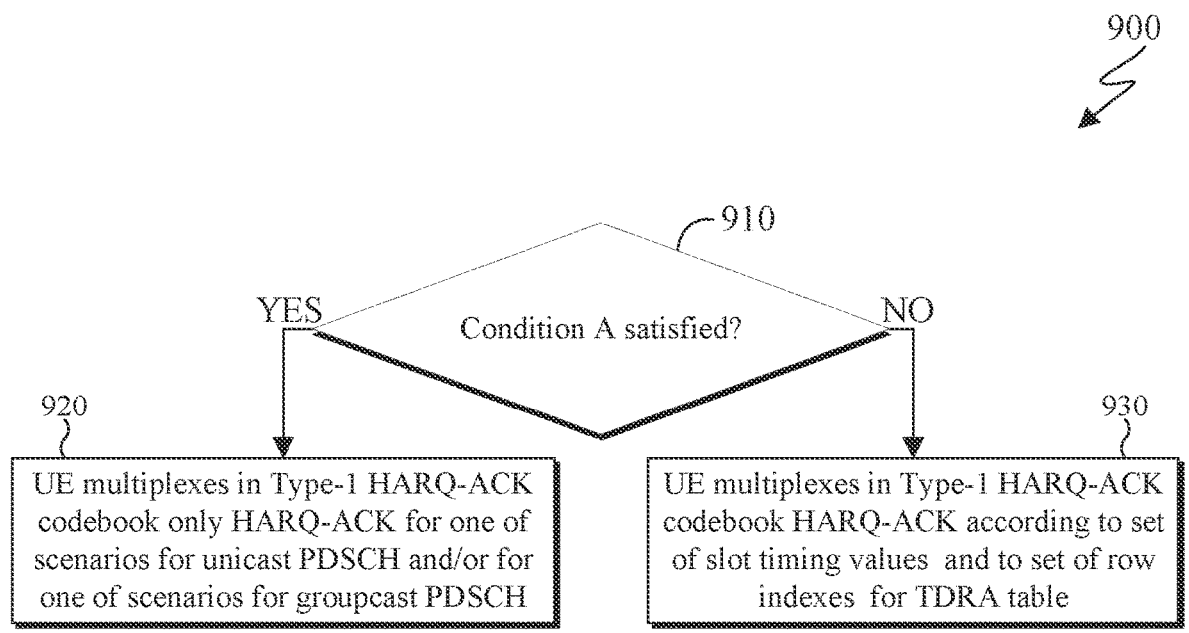
FIG. 9 illustrates an example method for a UE determining HARQ-ACK information to include a Type-1 HARQ-ACK codebook according to embodiments of the present disclosure.

FIG. 8 illustrates an example method 800 for a UE jointly determining for unicast PDSCH receptions and groupcast PDSCH receptions a single type-1 HARQ-ACK codebook according to embodiments of the present disclosure. FIG. 9 illustrates an example method 900 for a UE determining HARQ-ACK information to include a Type-1 HARQ-ACK codebook according to embodiments of the present disclosure. The steps of the method 800 and the method 900 can be performed by any of the UEs 111-119 of FIG. 1, such as the UE 116 of FIG. 3. The method 800 and the method 900 are for illustration only and other embodiments can be used without departing from the scope of the present disclosure.

In certain embodiments, a UE (such as the UE 116) is configured by higher layers whether to construct a separate or single/joint Type-1 HARQ-ACK codebooks for unicast and groupcast PDSCH receptions. The configuration can be applicable for the Type-1 HARQ-ACK codebook. The UE may separately construct respective Type-2 HARQ-ACK codebooks for unicast and groupcast.

For a serving cell c, a UE (such as the UE 116) determines a set of $M_{A,c}$ occasions for candidate PDSCH receptions for which the UE can transmit corresponding HARQ-ACK information in a PUCCH in slot $n_U$. The determination is based on a set of slot timing values $K_1$ associated with an active UL BWP. The determination is also based on a set of row indexes R of a table that is associated with the active DL BWP and defining respective sets of slot offsets $K_0$, start and length indicators SLIV, and PDSCH mapping types for PDSCH reception. The row indexes R of the table are provided by the union of row indexes of time domain resource allocation (TDRA) tables for DCI formats the UE is configured to monitor PDCCH for serving cell c. The determination can be further based on a ratio $2^{\mu_{DL}-\mu_{UL}}$ between the DL SCS configuration $\mu_{DL}$ and the UL SCS configuration $\mu_{UL}$ for the active DL BWP and the active UL BWP, respectively.

In certain embodiments, a PUCCH with a Type-1 HARQ-ACK codebook associated with unicast PDSCH reception is transmitted in a same UL BWP as a PUCCH with a Type-1 HARQ-ACK codebook associated with groupcast PDSCH receptions and therefore the UL SCS configuration $\mu_{UL}$ is same. Further, an active DL BWP for groupcast PDSCH receptions is assumed to be same as a DL BWP for unicast PDSCH receptions or, if a separate DL BWP is used for groupcast PDSCH receptions, to have a same DL SCS configuration $\mu_{DL}$ as the DL BWP for unicast PDSCH receptions. Accordingly, the ratio $2^{\mu_{DL}-\mu_{UL}}$ is same for the unicast Type-1 HARQ-ACK codebook and the groupcast Type-1 HARQ-ACK codebook and can be same for a joint unicast/groupcast Type-1 HARQ-ACK codebook.

Denoting by $K_{1,U}$ a set of slot timing values associated with unicast PDSCH receptions and by $K_{1,G}$ a set of slot timing values associated with groupcast PDSCH receptions, $K_1$ can be determined as the union of $K_{1,U}$ and $K_{1,G}$ as shown in Equation (2), below.

$$K_1 = K_{1,U} \cup K_{1,G}. \quad (2)$$

For example, $K_{1,U}$ and $K_{1,G}$ can be always same and only one, such as $K_{1,U}$, can be provided to a UE by higher layers or be defined in the specifications of the system operation. For another example, $K_{1,G}$ can be a subset of $K_{1,U}$. For yet another example, $K_{1,U}$ or $K_{1,G}$ may include at least one value that is not included in $K_{1,G}$ or $K_{1,U}$, respectively.

Denoting by $R_U$ the set of row indexes of a table that is associated with the active DL BWP for unicast PDSCH receptions and by $R_G$ the set of row indexes of a table that is associated with the active DL BWP, if different, for groupcast PDSCH receptions, R can be determined as the union of $R_U$ and $R_G$ as shown in Equation (3), below.

$$R = R_U \cup R_G. \quad (3)$$

For example, $R_U$ and $R_G$ can be always same and only one, such as $R_U$, can be provided to a UE by higher layers or otherwise be defined in the specifications of the system operations. For another example, $R_G$ can be a subset of $R_U$. For yet another example, $R_U$ or $R_G$ may include at least one value that is not included in $R_G$ or $R_U$, respectively.

By determining a Type-1 HARQ-ACK codebook for the union of the sets of slot timing values as described in Equation (2) for unicast PDSCH receptions and groupcast PDSCH receptions and by the union of the sets of row indexes for TDRA tables values as described in Equation (3) for unicast PDSCH receptions and groupcast PDSCH receptions, a size of the Type-1 HARQ-ACK codebook is reduced when the sets include common elements as a UE generates/reports a corresponding HARQ-ACK information once for a candidate PDSCH reception, instead of twice. Further, a UE may not generate HARQ-ACK information values for any unicast PDSCH receptions or for any groupcast PDSCH receptions if the UE does not receive at least one unicast PDSCH reception or groupcast PDSCH reception, respectively.

The method 800 as shown in FIG. 8 a UE (such as the UE 116) receives a configuration, or otherwise determines by the specification of the system operation, for a set of slot timing values $K_{1,U}$ associated with unicast PDSCH receptions and for a set of slot timing values $K_{1,G}$ associated with groupcast PDSCH receptions and determines a union of slot timing values as described in Equation (2) (step 810). It is also possible that when a UE is configured to provide a single Type-1 HARQ-ACK codebook for unicast and groupcast PDSCH receptions, the UE is provided by higher layers with $K_1$ or, equivalently, the UE is provided $K_{1,U}$ without being provided $K_{1,G}$.

In step 820, the UE also receives a configuration for a set of row indexes $R_U$ of a table that is associated with unicast PDSCH receptions and for a set of row indexes $R_G$ associated with groupcast PDSCH receptions and determine a set of row indexes as described in Equation (3) for a TDRA table associated with both unicast and groupcast PDSCH receptions. As for the sets of slot timing values, it is also possible that when a UE is configured to provide a single Type-1 HARQ-ACK codebook for unicast and groupcast PDSCH receptions, the UE is provided by higher layers with R or, equivalently, the UE is provided $R_U$ without being provided $R_G$.

In step 830, The UE determines a Type-1 HARQ-ACK codebook that includes HARQ-ACK information for both unicast and groupcast PDSCH receptions based on the set of slot timing values $K_1$ and based on the set of row indexes R.

In certain embodiments, a CRC of DCI format 1_0 is also used scrambled by a G-RNTI, such as to support communication during time periods where there can be an ambiguity at a serving BS for whether or not UEs have applied new configurations for values of fields as indicated by higher layers, at least when the DCI format 1_0 is provided by a PDCCH reception according to a CSS (to ensure a same size for all UEs with a same active DL BWP). Then, if a UE reports HARQ-ACK information in a PUCCH for a groupcast, within the $M_{A,c}$ occasions for candidate groupcast PDSCH receptions, the UE determines a HARQ-ACK codebook only for the groupcast SPS PDSCH release or only for the groupcast PDSCH reception or only for groupcast SPS PDSCH receptions according to corresponding $M_{A,c}$ occasion(s) on respective serving cell(s). It is noted that the UE reports HARQ-ACK information in a PUCCH for a groupcast if the groupcast is (i) a groupcast SPS PDSCH release indicated by DCI format 1_0 with CRC scrambled by G-RNTI and counter DAI field value of 1, (ii) a groupcast PDSCH reception scheduled by DCI format 1_0 with CRC scrambled by a G-RNTI and with counter DAI field value of 1 on the primary cell, or (iii) groupcast SPS PDSCH reception(s). If the CRC of DCI format 1_0 is not scrambled by a G-RNTI, the above determination can apply for the DCI format scheduling groupcast PDSCH receptions instead of DCI format 1_O.

In certain embodiments, when a UE multiplexes HARQ-ACK information associated with unicast and groupcast PDSCH receptions in a PUCCH or a PUSCH and any one of the above conditions is satisfied for unicast and/or groupcast PDSCH receptions, then the UE determines a HARQ-ACK codebook only for certain instances.

For example, the UE can determine a HARQ-ACK codebook only for the unicast SPS PDSCH release. For another example, the UE can determine a HARQ-ACK codebook only for the unicast PDSCH. For another example, the UE can determine a HARQ-ACK codebook only for unicast SPS PDSCHs. For another example, the UE can determine a HARQ-ACK codebook only for the groupcast SPS PDSCH release. For another example, the UE can determine a HARQ-ACK codebook only for the groupcast PDSCH. For yet another example, the UE can determine a HARQ-ACK codebook only for groupcast SPS PDSCHs according to joint (union of) $M_{A,c}$ occasion(s) on respective serving cell(s).

The UE can also determine a HARQ-ACK codebook only for a SPS PDSCH release indicated by DCI format 1_0 with CRC scrambled by C-RNTI and counter DAI field value of 1 and only for groupcast SPS PDSCH receptions. For example, the UE can determine a HARQ-ACK codebook only for a PDSCH reception scheduled by DCI format 1_0 with CRC scrambled by a C-RNTI and counter DAI field value of 1 on the primary cell and only for a SPS PDSCH release indicated by DCI format 1_0 with CRC scrambled by G-RNTI and counter DAI field value of 1. The DAI values are separately counted in DCI formats with CRC scrambled by C-RNTI and in DCI formats with CRC scrambled by G-RNTI. The HARQ-ACK information for groupcast PDSCH release, PDSCHs scheduled by DCI format 1_0, or SPS PDSCHs can be located after the HARQ-ACK information for unicast PDSCH release, PDSCHs scheduled by DCI format 1_0, or SPS PDSCHs.

The method 900 as shown in FIG. 9 a UE (such as the UE 116) determines whether a condition is satisfied (step 910). For example, the condition can be that the UE determines a unicast SPS PDSCH release indicated by a DCI format 1_0 with counter DAI field value of 1. For example, the condition can be that the UE determines a unicast PDSCH scheduled by DCI format 1_0 with counter DAI field value of 1 on the primary cell. For example, the condition can be that the UE determines unicast groupcast SPS PDSCH(s). For example, the condition can be that the UE determines a groupcast SPS PDSCH release indicated by a DCI format 1_0 with counter DAI field value of 1. For example, the condition can be that the UE determines a groupcast PDSCH scheduled by DCI format 1_0 with counter DAI field value of 1 on the primary cell. For yet example, the condition can be that the UE determines groupcast SPS PDSCH(s). It is noted that one or more of the conditions specified above can be applicable in step 910.

When the UE determines that the condition is satisfied, then in step 920, the UE multiplexes in a Type-1 HARQ-ACK codebook only HARQ-ACK information for one of the scenarios for unicast PDSCH and/or for one of the scenarios for groupcast PDSCH. Alternately, when the UE determines that the condition is not satisfied, then in step 930, the UE multiplexes in Type-1 HARQ-ACK codebook HARQ-ACK information according to the set of slot timing values $K_1$ and the set of row indexes R for the TDRA table.

In certain embodiments, when the CRC of DCI format 1_0 is scrambled with a G-RNTI, the interpretation of the contents of DCI format 1_0 can be different than when the CRC of DCI format 1_0 is scrambled with a C-RNTI. For example, a TPC command field, or a PUCCH resource indicator field, or an identifier of DCI format field may not exist in DCI format 1_0 with CRC scrambled with G-RNTI. Instead, the bits of those fields can be used to provide other information or be reserved and possibly set to a predetermined value. For example, a some of the bits can be used as a new field that provides single cell MCCH (SC-MCCH) change notification informing of an update to a mapping between a Temporary Mobile Group Identity (TMGI) and a G-RNTI.

Although FIGS. 8 and 9 illustrate the methods 800 and 900 various changes may be made to FIGS. 8 and 9. For example, while the method 800 of FIG. 8 and the method 900 of FIG. 9 are shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure describe Type-2 HARQ-ACK codebook determination for a TB scheduled by DCI format with C-RNTI and G-RNTI. The following examples and embodiments, such as those of FIG. 10 describe Type-2 HARQ-ACK codebook determinations. As described herein, the UE can determine a Type-2 HARQ-ACK codebook to provide HARQ-ACK information for a TB decoding outcome depending on a RNTI of the DCI format scheduling a PDSCH reception that provides the TB.

Figure 10:
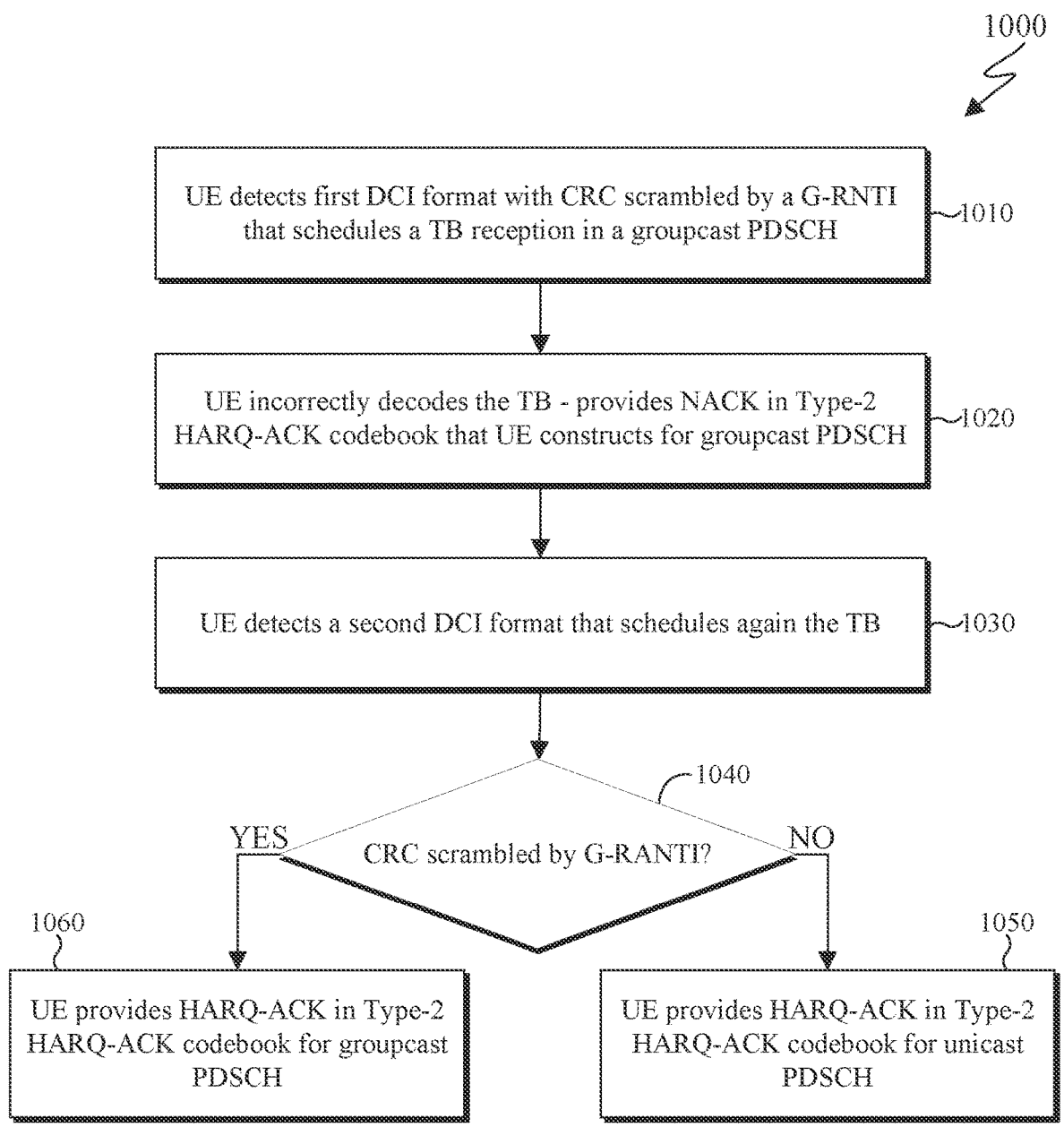
FIG. 10 illustrates an example method for a UE determining a Type-2 HARQ-ACK codebook to include HARQ-ACK information in response to a transport block (TB) reception HARQ-ACK according to embodiments of the present disclosure.

FIG. 10 illustrates an example method 1000 for a UE determining a Type-2 HARQ-ACK codebook to include HARQ-ACK information in response to a TB reception HARQ-ACK according to embodiments of the present disclosure. The steps of the method 1000 can be performed by any of the UEs 111-119 of FIG. 1, such as the UE 116 of FIG. 3. The method 1000 is for illustration only and other embodiments can be used without departing from the scope of the present disclosure.

In certain embodiments, groupcast PDSCH receptions are (i) scheduled by a DCI format with CRC scrambled by a G-RNTI or (ii) for SPS PDSCH receptions and activated by a DCI format with CRC scrambled by a G-RNTI. A UE (such as the UE 116) includes HARQ-ACK information in a first Type-2 codebook for unicast PDSCH receptions, as for PDSCH receptions scheduled by a DCI format with CRC scrambled by a C-RNTI, when the CRC of the DCI format activating the SPS PDSCH receptions is scrambled by a C-RNTI. Otherwise, when the CRC of the DCI format activating the SPS PDSCH receptions is scrambled by a G-RNTI, the UE includes HARQ-ACK information in a second Type-2 codebook for groupcast PDSCH receptions, as for PDSCH receptions scheduled by a DCI format with CRC scrambled by a G-RNTI.

ABS can provide an initial transmission of a TB through a groupcast PDSCH that the gNB schedules using a DCI format with CRC scrambled by a G-RNTI. For example, when the gNB receives from a UE HARQ-ACK information with NACK value for the TB decoding, the gNB can retransmit the TB using a groupcast PDSCH. This can occur when (i) multiple UEs reported a NACK value for the TB, or (ii) a unicast PDSCH for example when a few UE reported a NACK value for the TB.

It is noted that using a unicast PDSCH transmission can be preferable to the gNB for several reasons. For example, a unicast PDSCH can be scheduled through a PDCCH with a smaller CCE aggregation level as the gNB may not configure to UEs PDCCH candidates with small CCE aggregation levels for scheduling groupcast PDSCH receptions since there can be UEs with low signal-to-interference and noise ratios (SINRs) that need to reliably detect a corresponding DCI format. For another example, the gNB can configure a UE to receive PDCCH for scheduling unicast PDSCH more frequently than PDCCH for scheduling groupcast PDSCH, as unicast service types may require higher throughput or lower latency, and then the gNB has more opportunities to retransmit the TB using a unicast PDSCH.

When a retransmission of a TB uses a unicast PDSCH, a UE (such as the UE 116) can identify that the UE previously received the TB in a groupcast PDSCH reception (and the UE reported a NACK value for the decoding outcome of the TB reception) based on (i) a value of a HARQ process number field in the associated DCI format and (ii) a value of an NDI field. A DAI field in a DCI format scheduling the TB retransmission in a unicast PDSCH needs to count DCI formats scheduling unicast PDSCH receptions and counting for the DCI format scheduling the PDSCH reception with the TB is skipped. Otherwise, if the UE fails to detect the DCI format, the UE cannot know whether the TB in the associated unicast PDSCH reception is a previously received TB in a groupcast PDSCH reception. Therefore, a UE determines whether to include a HARQ-ACK information for a TB reception in a HARQ-ACK codebook associated with groupcast PDSCH receptions or in a HARQ-ACK codebook associated with unicast PDSCH receptions depending on the RNTI used to scramble the CRC bits of the DCI format scheduling the corresponding PDSCH reception. Further, for a same TB, HARQ-ACK information for a first decoding outcome of a TB can be in a first HARQ-ACK codebook such as one associated with groupcast PDSCH receptions and HARQ-ACK information for a second decoding outcome for the TB can be in a second HARQ-ACK codebook such as one associated with unicast PDSCH receptions.

As shown in the method 1000 of FIG. 10, a UE detects a first DCI format with CRC scrambled by a G-RNTI that schedules an initial TB reception (step 1010). In step 1020, the UE incorrectly decodes the TB and provides HARQ-ACK information with NACK value in a Type-2 HARQ-ACK codebook that the UE constructs for groupcast PDSCH receptions. In step 1030, the UE detects a second DCI format that schedules again the TB reception. The UE determines whether the CRC of the second DCI format is scrambled by a G-RNTI or by a C-RNTI.

In step 1040, the UE determines whether CRC is scrambled by G-RANTI. In response to the UE determining that the CRC of the DCI format is scrambled by a C-RNTI, the UE provides corresponding HARQ-ACK information in a Type-2 HARQ-ACK codebook that the UE constructs for unicast PDSCH receptions (Step 1050). Alternatively, in response to the UE determining that the CRC of the DCI format is scrambled by a G-RNTI, the UE provides corresponding HARQ-ACK information in a Type-2 HARQ-ACK codebook that the UE constructs for groupcast PDSCH receptions (step 1060).

Although FIG. 10 illustrate the method 1000 various changes may be made to FIG. 10. For example, while the method 1000 of FIG. 10 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe a mode for HARQ-ACK reporting. The following examples and embodiments, such as those of FIG. 11 describe that a HARQ-ACK reporting mode depends on whether a PDSCH reception is scheduled by a DCI format.

Figure 11:
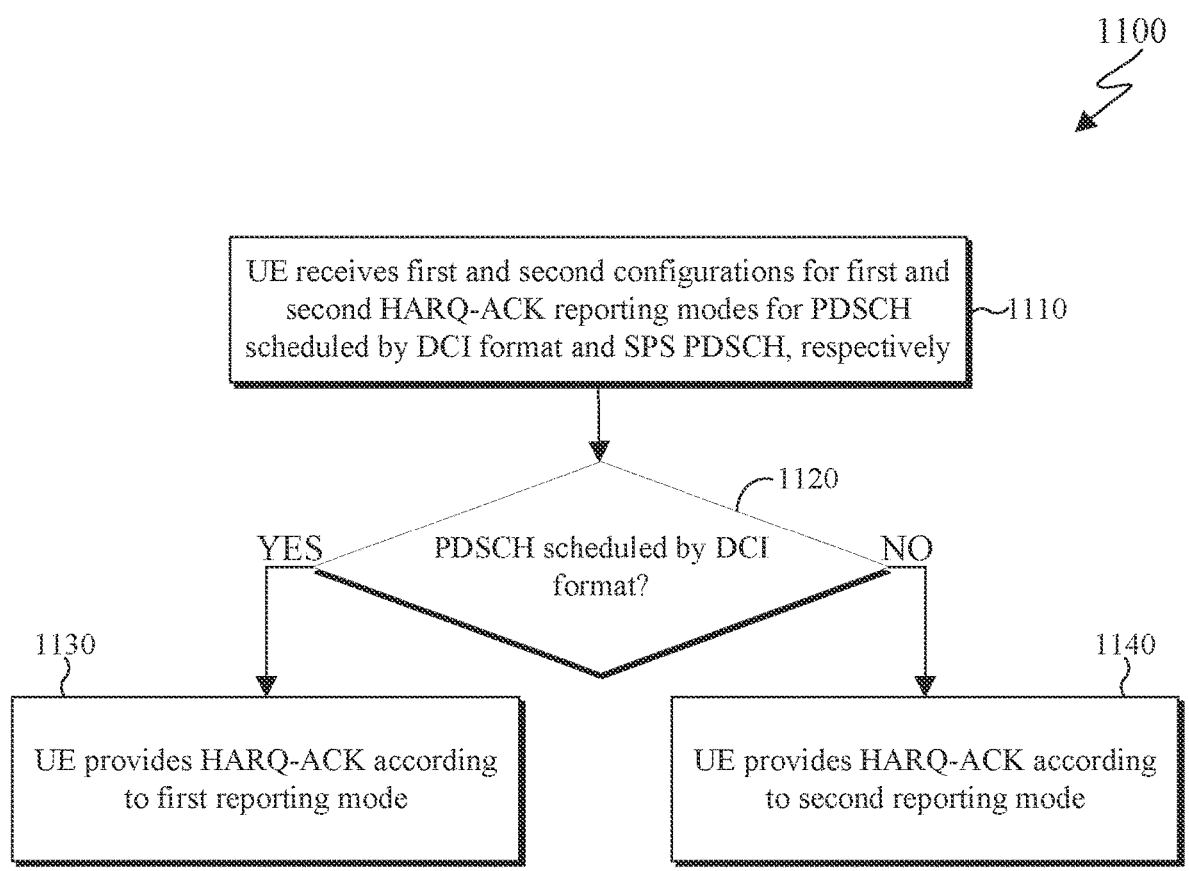
FIG. 11 illustrates an example method for a UE determining whether to transmit a PUCCH to indicate a Negative acknowledgement (NACK) value or transmit a PUCCH to indicate either ACK or a NACK value for HARQ-ACK information according to embodiments of the present disclosure.

FIG. 11 illustrates an example method 1100 for a UE determining whether to transmit a PUCCH to indicate a Negative acknowledgement (NACK) value or transmit a PUCCH to indicate either ACK or a NACK value for HARQ-ACK information according to embodiments of the present disclosure. The steps of the method 1100 can be performed by any of the UEs 111-119 of FIG. 1, such as the UE 116 of FIG. 3. The method 1100 is for illustration only and other embodiments can be used without departing from the scope of the present disclosure.

In certain embodiments, a UE is configured to transmit a PUCCH to indicate at least a NACK value for corresponding HARQ-ACK information. This is to avoid incurring a large PUCCH overhead when all UEs receiving groupcast PDSCHs transmit PUCCH to report HARQ-ACK information. For example, for a single groupcast PDSCH reception, the BS can configure a same PUCCH resource, or a same set of PUCCH resources, for all UEs to transmit PUCCH. This in order to indicate at least a NACK value for an outcome of a TB decoding in a groupcast PDSCH reception.

To reduce a probability that interfering PUCCH transmissions from different UEs in a same PUCCH resource result to a reduced probability that the gNB can identify a PUCCH reception due to adding signals with random phases, the gNB can configure N PUCCH resources and a UE can pseudo-randomly determine one of the N PUCCH resources to transmit the PUCCH either based on the UE implementation or based on some formula such as N modulo (C-RNTI) or N modulo (UE_ID) where UE_ID is a global UE identity.

When there is a maximum of M PDSCH receptions that a UE (such as the UE 116) needs to potentially indicate a NACK value for each corresponding TB decoding outcome, a serving gNB can configure the UE with $$N_{PUCCH}^{total} = \binom{M}{1} + \binom{M}{2} + \cdots + \binom{M}{M} PUCCH$$

resources, where $$\binom{M}{k} = \frac{M!}{k!(M-k)!},$$

and $n! = 1 \cdot 2 \cdot \ldots \cdot n$. Then, the UE can perform resource selection to indicate PDSCH receptions, from the maximum of M PDSCH receptions, that the UE did not correctly decode a corresponding TB (NACK value).

For example, for M=4, $N_{PUCCH}^{total}=15$, and the UE can use the first 4 of the 15 resources to indicate a NACK for the first, second, third, and fourth PDSCH reception, can use the next 6 of the 15 PUCCH resources to indicate a NACK for the respective (first, second), (first, third), (first, fourth), (second, third), (second, fourth), and (third, fourth) PDSCH receptions, can use the next 4 of the 15 PUCCH resources to indicate NACK for the respective (first, second, third), (first, second, fourth), (first, third, fourth), (second, third, fourth) PDSCH receptions, and can use the last 1 of the 15 PUCCH resources to indicate a NACK for the (first, second, third, fourth) PDSCH receptions.

In certain embodiments, to avoid a missed DCI format detection resulting to errors, as then the UE does not transmit a PUCCH and the gNB may interpret an absence of PUCCH reception as an ACK, the gNB separately configures a HARQ-ACK report mode to a UE for PDSCH receptions that are scheduled by a DCI format, such as for activation of SPS PDSCH receptions, and for SPS PDSCH receptions. For example, the gNB can configure the UE to transmit PUCCH with HARQ-ACK information having either ACK or NACK value for TB decoding outcomes in PDSCH receptions that are scheduled by a DCI format and to configure the UE to transmit PUCCH only when indicating at least one NACK value for SPS PDSCH receptions. For a HARQ-ACK report associated with activation of SPS PDSCH receptions, the UE follows the configuration for PDSCH receptions that are scheduled by a DCI format.

As shown in the method 1100 of FIG. 11, a UE (such as the UE 116) receives a first configuration for a first HARQ-ACK reporting mode in response to PDSCH receptions scheduled by a DCI format and a second configuration for a second HARQ-ACK reporting mode in response to SPS PDSCH receptions (step 1110). For example, the first HARQ-ACK reporting mode can correspond to a PUCCH transmission with HARQ-ACK information of either ACK or NACK value and the second HARQ-ACK reporting mode can correspond to a PUCCH transmission only to indicate a NACK value.

In step 1120, the UE determines whether a PDSCH reception is scheduled by a DCI format or is a SPS PDSCH reception. When the PDSCH reception is scheduled by a DCI format, the UE provides HARQ-ACK information according to the first reporting mode (step 1130). Alternatively, The UE provides HARQ-ACK information according to the second reporting mode (step 1140).

In certain embodiments, a UE (such as the UE 116) is provided by higher layers first and second PUCCH configurations for transmission of PUCCH with HARQ-ACK information associated with unicast PDSCH receptions and with groupcast PDSCH receptions, respectively. Separate PUCCH configurations, PUCCH-Config, can enable better deployment flexibility for the network. For example, groupcast PDSCH may require PUCCH resources targeting different (e.g. smaller) HARQ-ACK information payloads than unicast ones due to less frequent scheduling, or absence of carrier aggregation or spatial multiplexing, and the like. If a UE is not provided an additional PUCCH-Config for PUCCH configuration associated with groupcast PDSCH, the UE uses that a same PUCCH-Config is associated with both unicast and groupcast PDSCH receptions. If there are multiple PUCCH-Config associated with unicast PDSCH receptions, the UE determines a PUCCH-Config with a same priority value as indicated for the HARQ-ACK information associated with a groupcast PDSCH receptions.

In certain embodiments, when there are multiple priorities for groupcast traffic (such as related to multiple corresponding latency or block error rate (BLER) targets), the UE is separately provided multiple PUCCH-Config for each priority. A priority value can be included in a PUCCH-Config for PUCCH transmissions configured by higher layers or can be indicated by a DCI format scheduling a groupcast PDSCH reception, or activating SPS PDSCH receptions, so that the UE can determine corresponding PUCCH transmission parameters.

In certain embodiments, a UE simultaneously transmits on a same cell group first PUCCH or PUSCH with first HARQ-ACK information associated with unicast PDSCH receptions and second PUCCH or PUSCH with second HARQ-ACK information associated with groupcast PDSCH receptions and one or more of the first or second HARQ-ACK information can have a different priority value. In this case, the UE can be provided separate configurations for whether or not the UE should multiplex the first and second HARQ-ACK information in a same PUCCH or PUSCH transmission. For example, when HARQ-ACK information associated with unicast PDSCH reception can have a priority value of 0 or 1 and HARQ-ACK information associated with groupcast PDSCH reception can have a priority value of 0 or 1, the UE can be provided first, second, third, or fourth higher layer parameters that indicate respectively whether the UE multiplexes (or does not multiplex) (i) HARQ-ACK for unicast PDSCH and priority 0 and HARQ-ACK for groupcast PDSCH and priority 0, (ii) HARQ-ACK for unicast PDSCH and priority 1 and HARQ-ACK for groupcast PDSCH and priority 0, (ii) HARQ-ACK for unicast PDSCH and priority 0 and HARQ-ACK for groupcast PDSCH and priority 1, or (iv) HARQ-ACK for unicast PDSCH and priority 1 and HARQ-ACK for groupcast PDSCH and priority 1.

If one of the higher layer parameters is not provided, a default UE behavior can be to not multiplex HARQ-ACK information associated with the higher layer parameter in a same PUCCH or PUSCH transmission. Then, if a UE (such as the UE 116) cannot simultaneously transmit more than one PUCCHs on cells of a cell group or cannot simultaneously transmit a PUSCH and a PUCCH on cells of a cell group, the UE can prioritize transmission of the PUCCH or PUSCH with larger priority value. For a same priority value, the UE can be indicated by another higher layer parameter whether to prioritize PUCCH transmission with HARQ-ACK information for either unicast PDSCH receptions or for groupcast PDSCH receptions, or the UE behavior can be defined in the specifications of the system operation such as for example the UE prioritizes a PUCCH or PUSCH transmission with unicast HARQ-ACK information.

Although FIG. 11 illustrate the method 1100 various changes may be made to FIG. 11. For example, while the method 1100 of FIG. 11 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe a procedure to determine a type or to enable/disable a HARQ-ACK information report. The following examples and embodiments, such as those of FIGS. 12 and 13 describe a procedure for determining a type or to enable/disable a HARQ-ACK information report. For example, the below examples and embodiments describe a procedure for enabling or disabling a HARQ-ACK information report from a UE in response to a unicast or groupcast PDSCH reception.

Figure 12:
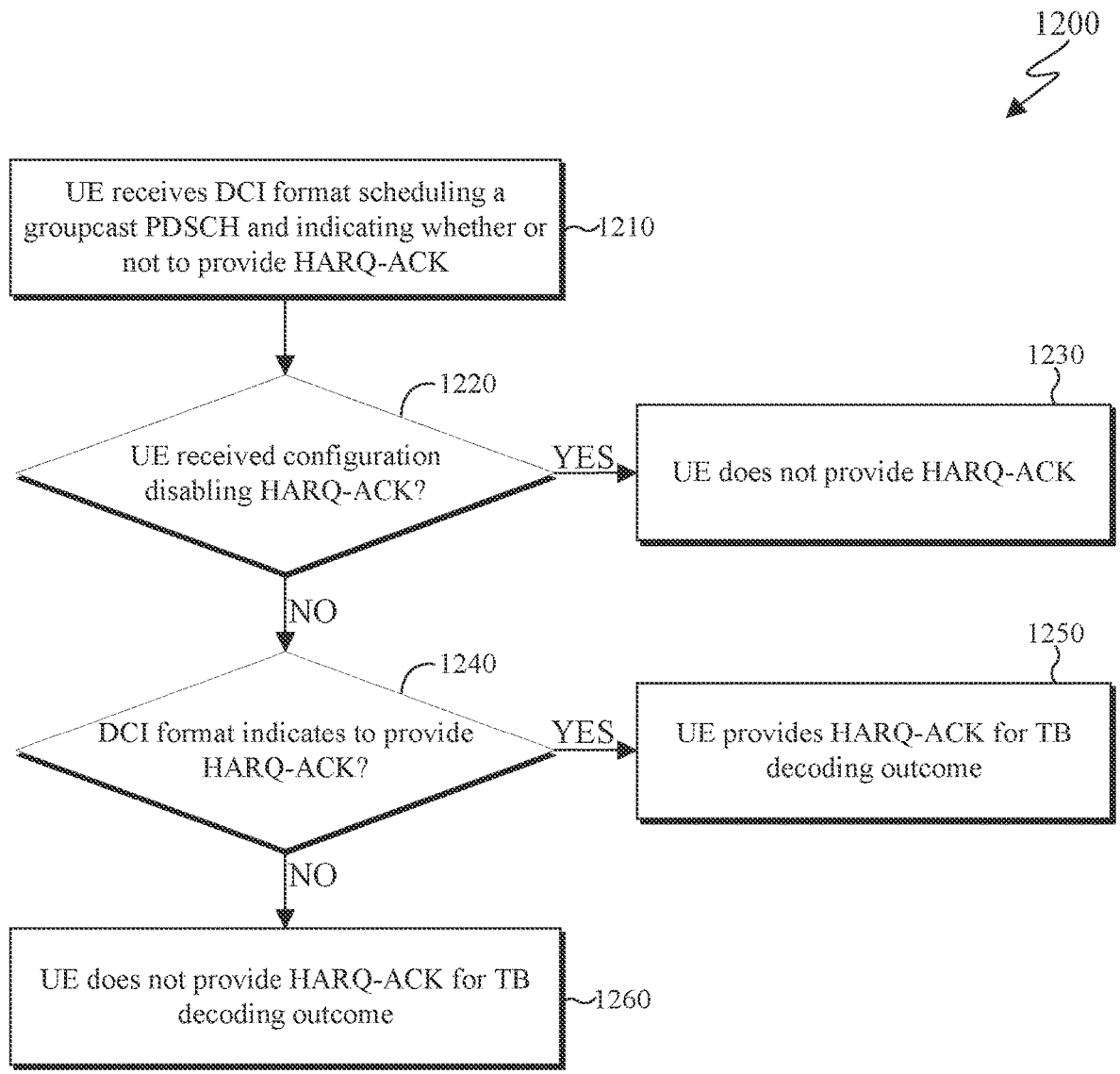
FIG. 12 illustrates an example method for a UE determining whether to transmit PUCCH with HARQ-ACK information according to embodiments of the present disclosure.
Figure 13:
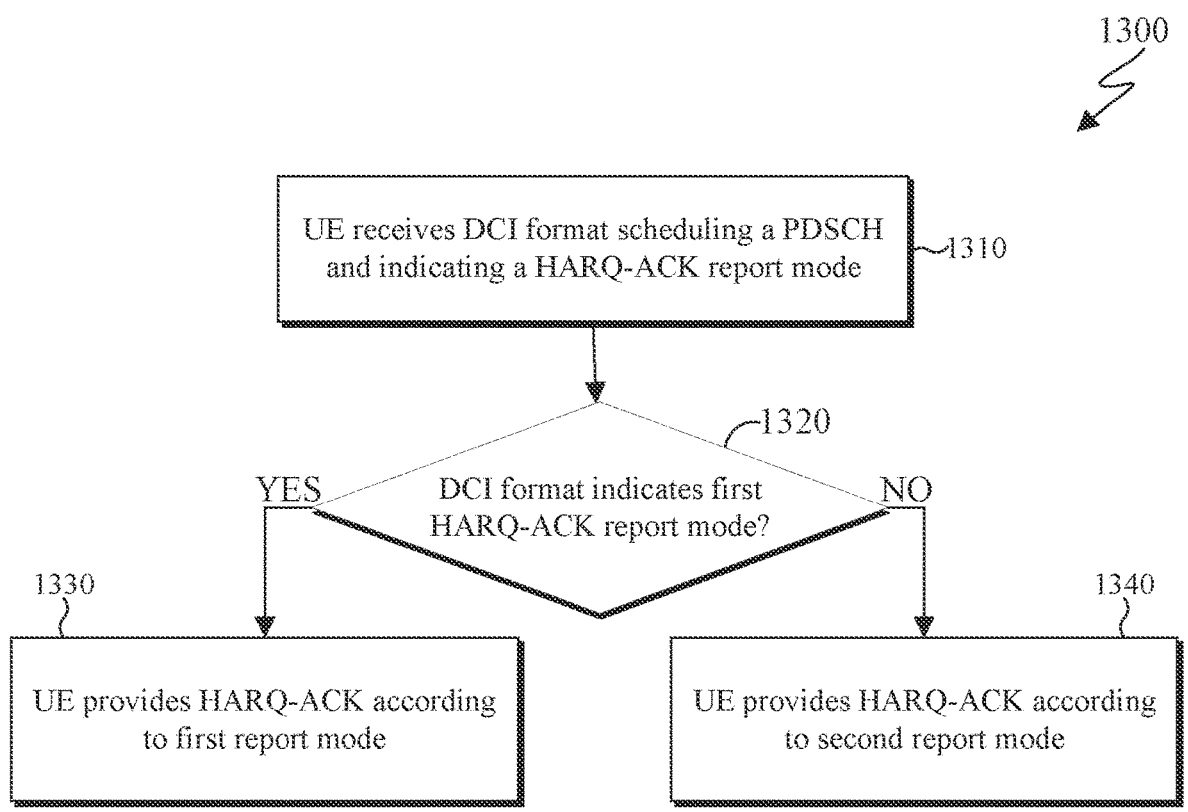
FIG. 13 illustrates an example method for a UE determining a HARQ-ACK information reporting type according to embodiments of the present disclosure.

FIG. 12 illustrates an example method 1200 for a UE determining whether to transmit PUCCH with HARQ-ACK information according to embodiments of the present disclosure. FIG. 13 illustrates an example method 1300 for a UE determining a HARQ-ACK information reporting type according to embodiments of the present disclosure. The steps of the method 1200 and the method 1300 can be performed by any of the UEs 111-119 of FIG. 1, such as the UE 116 of FIG. 3. The method 1200 and the method 1300 are for illustration only and other embodiments can be used without departing from the scope of the present disclosure.

In certain embodiments, a serving BS (such as the BS 102) configures by higher layer signaling a UE (such as the UE 116) whether to provide HARQ-ACK information reports in response to a decoding outcome of a TB in a (unicast or groupcast) PDSCH reception. The configuration can be applicable for all HARQ processes or can be per HARQ process. The configuration may be provided to disable (or to enable) HARQ-ACK information reports; if the configuration is not provided to a UE, HARQ-ACK information reports from the UE are enabled (or disabled). The BS can additionally indicate in a DCI format scheduling a PDSCH reception whether or not a UE should provide a HARQ-ACK information report in response to a decoding outcome of a TB in the PDSCH reception. The indication can be by a separate field in the DCI format, or by a specific value of another field such as a PDSCH-to-HARQ feedback timing indicator field or a PUCCH resource indicator field. For example, one value of the PDSCH-to-HARQ feedback timing indicator field, or one value of the PUCCH resource indicator field, can be used to indicate to UEs to not provide a HARQ-ACK information report. The indication by the DCI format is applicable only for UEs configured by higher layers to provide corresponding HARQ-ACK information reports. UEs configured by higher layers to not provide HARQ-ACK information reports do so regardless of the indication by the DCI format. For a SPS PDSCH reception, whether or not a corresponding HARQ-ACK information report is disabled can be included in the configuration parameters for the SPS PDSCH reception or can be indicated by the DCI format activating the SPS PDSCH reception.

As shown in the method 1200 of FIG. 12, a UE receives a DCI format scheduling a groupcast PDSCH reception that provides a TB and indicating to the UE whether or not to provide a corresponding HARQ-ACK information report (step 1210). In step 1220, the UE determines whether the UE received a configuration disabling HARQ-ACK information reports. Upon determining that the UE received the configuration (to disable HARQ-ACK), in step 1230, the UE does not provide a HARQ-ACK information report for a decoding outcome of the TB. Alternatively, if the UE did not receive the configuration, the UE, in step 1240, determines whether the DCI format indicates to provide a HARQ-ACK information report. If the DCI format indicates to provide a HARQ-ACK information report, the UE in step 1250, provides HARQ-ACK information for a TB decoding outcome. Alternatively, if the DCI format does not indicate that the UE is not to provide HARQ-ACK, then in step 1260, the UE does not provide HARQ-ACK information for a TB decoding outcome.

In certain embodiments, a DCI format indicates a HARQ-ACK reporting mode as described in the above. For example, the DCI format can include a field indicating whether the UE should provide HARQ-ACK information (transmit a PUCCH) in response to a TB decoding outcome only when the value is NACK or whether the UE should provide HARQ-ACK information regardless of a corresponding value. For example, instead of a separate field, a predetermined value of a PUCCH resource indication field can indicate to a UE to transmit PUCCH using the indicated resource only when the HARQ-ACK information has NACK value while remaining values of the PUCCH resource indication field can indicate to the UE to transmit PUCCH using the indicated resource regardless of the HARQ-ACK information value.

As shown in the method 1300 of FIG. 13, a UE receives a DCI format scheduling a PDSCH reception that provides a TB and indicating to the UE a corresponding HARQ-ACK report mode (step 1310). For example, the DCI format can indicate a PUCCH resource and different PUCCH resources can be associated with different HARQ-ACK report modes.

In step 1320, the UE determines whether the DCI format indicates a first HARQ-ACK report mode. When the DCI format indicates the first HARQ-ACK report mode, the UE, in step 1330 provides HARQ-ACK information in response to a decoding outcome for the TB according to the first HARQ-ACK report mode. When the DCI format does not indicate a first HARQ-ACK report mode, the UE in step 1340 provides HARQ-ACK information in response to a decoding outcome for the TB according to a second HARQ-ACK report mode.

Although FIGS. 12 and 13 illustrate the methods 1200 and 1300 various changes may be made to FIGS. 12 and 13. For example, while the method 1200 of FIG. 12 and the method 1300 of FIG. 13 are shown as a series of steps, various steps could overlap, occur in parallel, occur in a different order, or occur multiple times. In another example, steps may be omitted or replaced by other steps. For example, steps of the method 1200 can be executed in a different order.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a first physical uplink control channel (PUCCH) with first hybrid automatic repeat request acknowledgement (HARQ-ACK) information bits, the method comprising:
   receiving information for a set of PUCCH resources, wherein:
      the information for the set of PUCCH resources is included in a first configuration for PUCCH transmissions that are associated only with receptions of multicast physical downlink shared channels (PDSCHs), and
      the information for the set of PUCCH resources is included in a second configuration for PUCCH transmissions that are also associated with receptions of unicast PDSCHs when the first configuration is not provided;
   determining:
      values for the first HARQ-ACK information bits, wherein the first HARQ-ACK information bits are in response to receptions of the multicast PDSCHs, and
      a PUCCH resource from the set of PUCCH resources according to a combination of positive acknowledgement values and negative acknowledgement values for the first HARQ-ACK information bits; and
   transmitting the first PUCCH using the PUCCH resource.

2. The method of claim 1, wherein at least one of the first HARQ-ACK information bits has a negative acknowledgement value.

3. The method of claim 1, further comprising:
   determining that all values of second HARQ-ACK information bits are positive acknowledgement values; and
   suspending transmission of a second PUCCH for the second HARQ-ACK information bits.

4. The method of claim 3, further comprising:
   receiving a downlink control information (DCI) format that activates receptions of semi-persistently scheduled physical downlink shared channels (SPS PDSCHs) for a SPS PDSCH configuration; and
   transmitting a third PUCCH with a third HARQ-ACK information bit having a positive acknowledgement value in response to the DCI format reception, wherein the second HARQ-ACK information bits are in response to SPS PDSCH receptions.

5. The method of claim 1, wherein a number of the first HARQ-ACK information bits is predetermined based on a number of PUCCH resources in the set of PUCCH resources.

6. The method of claim 1, wherein:
   a HARQ-ACK information bit from the first HARQ-ACK information bits is in response to a reception of a multicast physical downlink shared channel (PDSCH) scheduled by a downlink control information (DCI) format,
   the DCI format does not include a transmit power control (TPC) command field and a DCI format identifier field when the DCI format schedules a multicast PDSCH reception, and
   the DCI format includes the TPC command field and the DCI format identifier field when the DCI format schedules a unicast PDSCH reception.

7. A user equipment (UE) comprising:
   a transceiver configured to receive information for a set of physical uplink control channel (PUCCH) resources, wherein:
      the information for the set of PUCCH resources is included in a first configuration for PUCCH transmissions that are associated only with receptions of multicast physical downlink shared channels (PDSCHs), and
      the information for the set of PUCCH resources is included in a second configuration for PUCCH transmissions that are also associated with receptions of unicast PDSCHs when the first configuration is not provided; and
   a processor operably coupled to the transceiver, the processor configured to determine:
      values for first hybrid automatic repeat request acknowledgement (HARQ-ACK) information bits, wherein the first HARQ-ACK information bits are in response to receptions of the multicast PDSCHs, and a PUCCH resource from the set of PUCCH resources according to a combination of positive acknowledgement values and negative acknowledgement values for the first HARQ-ACK information bits, wherein the transceiver is further configured to transmit a first PUCCH using the PUCCH resource.

8. The UE of claim 7, wherein at least one of the first HARQ-ACK information bits has a negative acknowledgement value.

9. The UE of claim 7, wherein:
the processor is further configured to determine that all values of second HARQ-ACK information bits are positive acknowledgement values, and
the transceiver is further configured to suspend transmission of a second PUCCH for the second HARQ-ACK information bits.

10. The UE of claim 9, wherein the transceiver is further configured to:
receive a downlink control information (DCI) format that activates receptions of semi-persistently scheduled physical downlink shared channels (SPS PDSCHs) for a SPS PDSCH configuration; and
transmit a third PUCCH with a third HARQ-ACK information bit having a positive acknowledgement value in response to the DCI format reception, wherein the second HARQ-ACK information bits are in response to SPS PDSCH receptions.

11. The UE of claim 7, wherein a number of the first HARQ-ACK information bits is predetermined based on a number of PUCCH resources in the set of PUCCH resources.

12. The UE of claim 7, wherein:
a HARQ-ACK information bit from the first HARQ-ACK information bits is in response to a reception of a multicast physical downlink shared channel (PDSCH) scheduled by a downlink control information (DCI) format,
the DCI format does not include a transmit power control (TPC) command field and a DCI format identifier field when the DCI format schedules a multicast PDSCH reception, and
the DCI format includes the TPC command field and the DCI format identifier field when the DCI format schedules a unicast PDSCH reception.

13. A base station comprising:
a transceiver configured to:
transmit information for a set of physical uplink control channel (PUCCH) resources, wherein:
the information for the set of PUCCH resources is included in a first configuration for PUCCH transmissions that are associated only with receptions of multicast physical downlink shared channels (PDSCHs), and
the information for the set of PUCCH resources is included in a second configuration for PUCCH transmissions that are also associated with receptions of unicast PDSCHs when the first configuration is not provided; and
receive a first PUCCH based on a PUCCH resource from the set of PUCCH resources; and
a processor operably coupled to the transceiver, the processor configured to determine a combination of positive acknowledgement values and negative acknowledgement values for first hybrid automatic repeat request acknowledgement (HARQ-ACK) information bits according to the PUCCH resource, wherein the first HARQ-ACK information bits are in response to receptions of the multicast PDSCHs.

14. The base station of claim 13, wherein at least one of the first HARQ-ACK information bits has a negative acknowledgement value.

15. The base station of claim 13, wherein the processor is further configured to:
identify an absence of a second PUCCH reception with second HARQ-ACK information bits in all PUCCH resources from the set of PUCCH resources; and
determine that all values of second HARQ-ACK information bits are positive acknowledgement values.

16. The base station of claim 15, wherein the transceiver is further configured to:
transmit a downlink control information (DCI) format that activates transmissions of semi-persistently scheduled physical downlink shared channels (SPS PDSCHs) for a SPS PDSCH configuration; and
receive a third PUCCH with a third HARQ-ACK information bit having a positive acknowledgement value in response to the DCI format transmission, wherein the second HARQ-ACK information bits are in response to SPS PDSCH transmissions.

17. The base station of claim 13, wherein a number of the first HARQ-ACK information bits is predetermined based on a number of PUCCH resources in the set of PUCCH resources.

18. The base station of claim 13, wherein:
a HARQ-ACK information bit from the first HARQ-ACK information bits is in response to a transmission of a multicast physical downlink shared channel (PDSCH) scheduled by a downlink control information (DCI) format,
the DCI format does not include a transmit power control (TPC) command field and a DCI format identifier field when the DCI format schedules a multicast PDSCH transmission, and
the DCI format includes the TPC command field and the DCI format identifier field when the DCI format schedules a unicast PDSCH transmission.

* * * * *